C. W. SCHIED.
TOOL FOR REMOVING OBSTRUCTIONS FROM PLUMBING PASSAGEWAYS.
APPLICATION FILED JAN. 27, 1917.
1,261,444.
Patented Apr. 2, 1918.
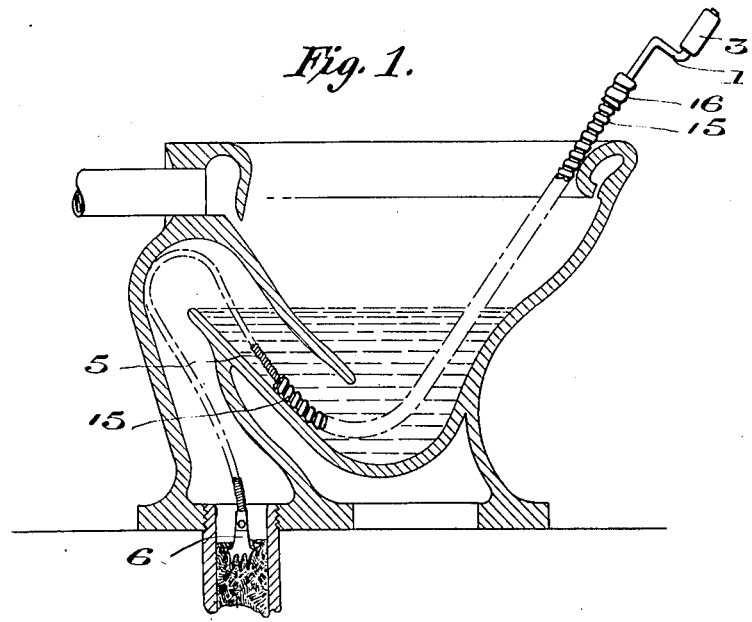
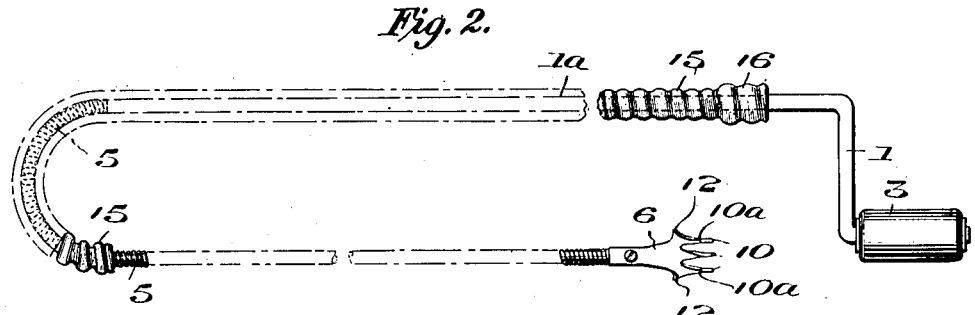
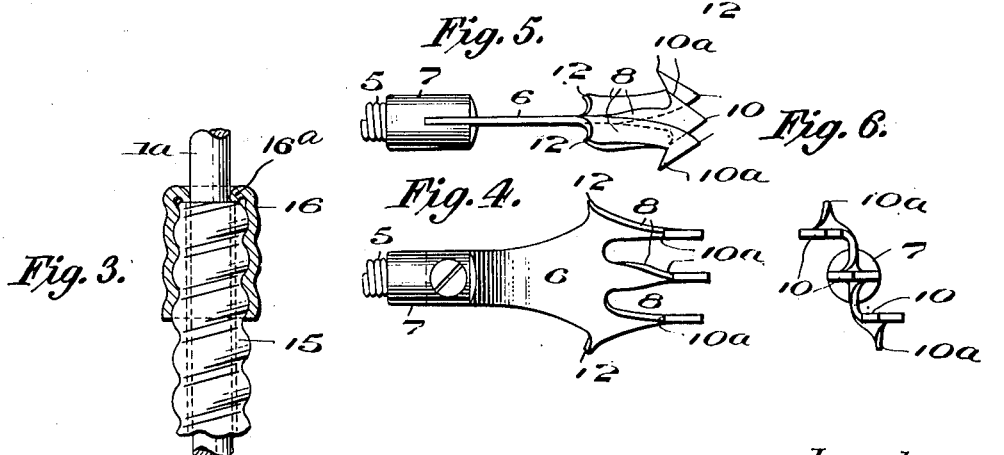
Inventor
Charles W. Schied.
By Eugene C. Brown
Atty.

UNITED STATES PATENT OFFICE.

CHARLES W. SCHIED, OF NEWARK, NEW JERSEY.

TOOL FOR REMOVING OBSTRUCTIONS FROM PLUMBING-PASSAGEWAYS.

1,261,444. Specification of Letters Patent. Patented Apr. 2, 1918.

Application filed January 27, 1917. Serial No. 144,872.

*To all whom it may concern:*

Be it known that I, CHARLES W. SCHIED, a citizen of the United States, residing at Newark, in the county of Essex and State of New Jersey, have invented certain new and useful Improvements in Tools for Removing Obstructions from Plumbing-Passageways, of which the following is a specification.

My invention relates to cleaning devices for removing obstructions from pipes, such as sewer and drain-pipes, sinks and water mains and is especially adapted for cleaning inclosed portions of plumbing having curved or irregular bends where accumulations may cause clogging and stoppage.

The object of my invention is to provide a device which will be capable of being readily inserted through an irregular and contorted channel to the seat of trouble and can then be operated to hook into and grip the obstructing object so as to remove it from the passage.

The several detail features constituting my improvement will be understood from the following description in connection with the accompanying drawings in which Figure 1 is a central sectional view of a water-closet trap showing my improved cleaning device in position to remove an obstruction in the connecting pipe; Fig. 2 is a side-elevation, partly broken away, of a cleaning tool embodying my invention; Fig. 3 is an enlarged fragmentary detail of the bushing forming a bearing for the operating end of the shaft; and Figs. 4, 5 and 6 are detail views of the grappling hook.

The rotatable portion of my cleaning tool consists of a rigid crank member 1, provided with a handle 3, and a shank 1ª to which is brazed or otherwise secured, one end of a helical spring 5, constituting a flexible shaft. The outer free end of the shaft carries a grappling fork 6 which is provided with a thimble 7 adapted to fit over and to be detachably secured to the end of the shaft and a plurality of tines 8.

It is highly important, in a tool of this character, that the grappling member should be able to penetrate or burrow into the obstruction and become so enmeshed or entangled therein that the obstruction may be readily withdrawn or removed. I have, therefore, devised a grappling tool which is especially adapted for this purpose. In the form illustrated, the outer tines are provided with sharp pointed heads 10, with a rearwardly projecting hook 10ª, the hook upon one tine projecting in the opposite direction from the other, while the central tine is provided with oppositely disposed hooks, or spurs, forming an arrow head, and may be a different length from the other tines. The rear end or base of each outer tine is prolonged into a rearwardly extending spur 12, the spurs upon opposite sides being turned laterally in opposite directions. For the purpose of strengthening the tines and making them more rigid, as well as to space the hook ends 10 farther apart to enable them to individually penetrate an object more readily, I twist each tine into a spiral conformation until the heads of the tines are in parallel planes and preferably perpendicular to the plane of the fork body 6. To still further enhance the grappling capacity, I prefer to bend the outer tines out of alinement with the central tine and in opposite directions as indicated in Fig. 6, each projecting in the direction of its hook or spur 10ª. The peculiar advantages inherent in this construction will be appreciated by engineers and those familiar with grappling tools of this kind.

I have found that the very flexible coiled shaft 5, may be inserted into the tortuous passageway and may be operated more effectively if the inner portion is incased in a somewhat less flexible sheath. I therefore surround the flexible shaft 5 with a flexible casing or sheath 15, which may be substantially like the flexible conduits used to house electric conductors. To provide a bearing for the crank shank 1ª, I supply a ferrule or bushing 16, which may be spirally corrugated to thread upon the end of the spirally formed flexible sheath 15 and is formed with an inwardly turned end 16ª to constitute a bearing for the shank 1ª.

In operation, the ferrule end 16 is grasped in one hand while the handle is pulled outwardly until the flexible shafting is slipped through the sheath to bring the grappling fork 6 adjacent the end of the sheath. The apparatus is first inserted in the waste pipe or other passage to be cleaned and the shafting is then pushed forward through the sheath until the grappling member engages the obstruction in the manner illustrated in Fig. 1. In same cases it will be possible to push the clogging material down into the drain pipe by direct pressure.

When this cannot be done, which may usually be the case, the crank handle may be given a few turns, causing the forked tines to penetrate the obstruction; then by gradually withdrawing the tool, while turning the handle the prongs and spurs will embed themselves and hold the obstacle fast until it is withdrawn.

With this device, anything in the nature of paper, rags, hair, soap and similar substances may be removed with absolute certainty and usually a stoppage can be removed without resorting to the services of a plumber or other skilled workman.

This device will be found of special value in apartment houses, hotels, office buildings, and on board ships where a large amount of plumbing is involved and the liability of stoppage is considerable.

I claim:—

1. A device for removing obstructions from passages in plumbing, flues and the like, comprising a flexible sheath, a flexible shafting extending therethrough and longitudinally slidable therein, a handle having a rigid shank secured to the inner end of said shafting, and a substantially flat grappling member secured to the outer end of the shafting having pronged tines twisted out of the plane of the body portion or shank of said member.

2. A device for removing obstructions from passages in plumbing, flues and the like, comprising a flexible sheath, a flexible shafting extending therethrough and longitudinally slidable therein, a handle having a rigid shank secured to the inner end of said shafting, and a substantially flat grappling member secured to the outer end of the shafting having pronged tines twisted out of the plane of the body portion or shank of said member and extending in substantially parallel planes at an angle to the body of said member.

3. A device for removing obstructions from passages in plumbing, flues and the like, comprising a flexible sheath, a flexible shafting extending therethrough and longitudinally slidable therein, a handle having a rigid shank secured to the inner end of said shafting, and a substantially flat grappling member secured to the outer end of the shafting having pronged tines twisted out of the plane of the body portion or shank of said member, the outer tines being offset laterally from the central tine and in opposite directions.

4. A device for removing obstructions from passages in plumbing, flues and the like, comprising a flexible sheath, a flexible shafting extending therethrough and longitudinally slidable therein, a handle having a crank portion and a rigid shank portion secured to the inner end of said shafting, a bushing secured to the inner end of said sheath and forming a bearing for said shank, and a substantially flat grappling member secured to the outer end of the shafting having pronged tines twisted out of the plane of the body portion or shank of said member.

In testimony whereof I affix my signature.

CHARLES W. SCHIED.